(12) United States Patent
Nakamura et al.

(10) Patent No.: US 10,780,846 B2
(45) Date of Patent: Sep. 22, 2020

(54) UTILITY VEHICLE

(71) Applicant: KAWASAKI JUKOGYO KABUSHIKI KAISHA, Kobe-shi, Hyogo (JP)

(72) Inventors: Kenta Nakamura, Kobe (JP); Kazunori Yamada, Kakogawa (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 87 days.

(21) Appl. No.: 16/229,385

(22) Filed: Dec. 21, 2018

(65) Prior Publication Data

US 2020/0198554 A1 Jun. 25, 2020

(51) Int. Cl.
*B60R 13/07* (2006.01)
*B62D 33/06* (2006.01)
*B62D 25/24* (2006.01)
*B62D 21/18* (2006.01)

(52) U.S. Cl.
CPC ............ *B60R 13/07* (2013.01); *B62D 21/183* (2013.01); *B62D 25/24* (2013.01); *B62D 33/0625* (2013.01)

(58) Field of Classification Search
CPC ...... B60R 13/07; B62D 21/183; B62D 25/24; B62D 33/0625
USPC ....................................................... 296/208
See application file for complete search history.

(56) References Cited

U.S. PATENT DOCUMENTS

| 9,776,481 | B2* | 10/2017 | Deckard | B60G 11/265 |
| 10,633,034 | B2* | 4/2020 | Miwa | B62D 25/18 |
| 2010/0090503 | A1* | 4/2010 | Uchino | B62D 25/16 |
| | | | | 296/198 |
| 2013/0319785 | A1* | 12/2013 | Spindler | B60K 15/03 |
| | | | | 180/292 |
| 2018/0147966 | A1* | 5/2018 | Reed | B62D 47/003 |
| 2018/0178677 | A1* | 6/2018 | Swain | B62D 21/183 |
| 2019/0031260 | A1* | 1/2019 | Filion | B60R 21/13 |
| 2019/0048832 | A1* | 2/2019 | Reedy | F02M 25/0854 |
| 2019/0126992 | A1* | 5/2019 | Nagai | B62D 25/20 |
| 2020/0164742 | A1* | 5/2020 | Safranski | B60G 3/20 |

* cited by examiner

*Primary Examiner* — Jason S Morrow
(74) *Attorney, Agent, or Firm* — Alleman Hall Creasman & Tuttle LLP

(57) ABSTRACT

A utility vehicle comprises a vehicle body frame including: side frame sections, a cabin frame section, and a cross frame section; and a frame cover including a dash cover section disposed forward of seats, and a tire upper cover section disposed forward of the dash cover section and above a front wheel, the frame cover defining a frame accommodating space. The frame cover is provided with an opening through which the frame accommodating space and an outside region are in communication with each other, the vehicle body frame being configured to pass through the opening. A discharge port is disposed below the opening to discharge water to an outside region. A guide is provided in the frame accommodating space, and includes a guide surface inclined in a downward direction toward the discharge port, to guide the water in the frame accommodating space to the discharge port.

9 Claims, 8 Drawing Sheets

US 10,780,846 B2

UTILITY VEHICLE

BACKGROUND OF THE INVENTION

Field of the Invention

The present invention relates to a utility vehicle.

Description of the Related Art

For example, U.S. Pat. No. 9,776,481B2 discloses a four-wheel-drive utility vehicle which is able to travel off-road (travel on an uneven road surface). This utility vehicle includes a vehicle body frame which is supported by a pair of front wheels and a pair of rear wheels and are comprised of a plurality of frame portions, and a frame cover comprised of a plurality of frame cover portions disposed to cover a part of the plurality of frame portions. Some of the plurality of frame cover portions are provided with openings through which the frame portions pass.

At a certain location of the opening formed in the frame cover portion, water which externally flows through a clearance formed between this opening and the frame portion passing through this opening, may enter a riding space in which a driver seat and a passenger seat are provided.

SUMMARY OF THE INVENTION

In view of the above-described circumstances, an object of the present invention is to prevent a situation in which water which externally flows into a utility vehicle through an opening formed in a frame cover, enters a riding space of the utility vehicle.

According to an aspect of the present invention, a utility vehicle comprises a vehicle body frame including: a pair of right and left side frame sections extending in a forward and rearward direction, on right and left sides of a riding space where a driver seat and a passenger seat are provided, a cabin frame section surrounding the riding space at a location that is above the pair of right and left side frame sections, and a cross frame section extending in a rightward and leftward direction at a location that is forward of the driver seat and the passenger seat and connecting the pair of right and left side frame sections to each other, and a frame cover including a dash cover section disposed forward of the driver seat and the passenger seat, and a tire upper cover section disposed at a location that is forward of the dash cover section and above a front wheel, the frame cover defining a frame accommodating space for accommodating the cross frame section, between the dash cover section and the tire upper cover section, wherein the frame cover is provided with at least one opening through which the frame accommodating space and an outside region are in communication with each other, the vehicle body frame being configured to pass through the at least one opening, wherein a discharge port is disposed below the at least one opening to discharge to the outside region, water which externally flows into the frame accommodating space through the at least one opening, and wherein a guide is provided in the frame accommodating space, and includes a guide surface inclined in a downward direction toward the discharge port, the guide being configured to guide to the discharge port, water which flows into the frame accommodating space through the at least one opening.

In accordance with this configuration, even in a case where the water externally flows into the frame accommodating space through the opening, this water is guided by the guide to the discharge port and discharged to an outside region of the frame accommodating space through the discharge port. This makes it possible to prevent a situation in which the water which externally flows into the frame accommodating space through the opening, enters the riding space of the utility vehicle.

The above and further objects, features and advantages of the present invention will more fully be apparent from the following detailed description of preferred embodiment with reference to the accompanying drawings.

DETAILED DESCRIPTION OF THE PREFERRED EMBODIMENTS

Hereinafter, the embodiment of the present invention will be described with reference to the drawings. The stated directions are from the perspective of a driver or passenger riding in a utility vehicle 1.

Figure 1:
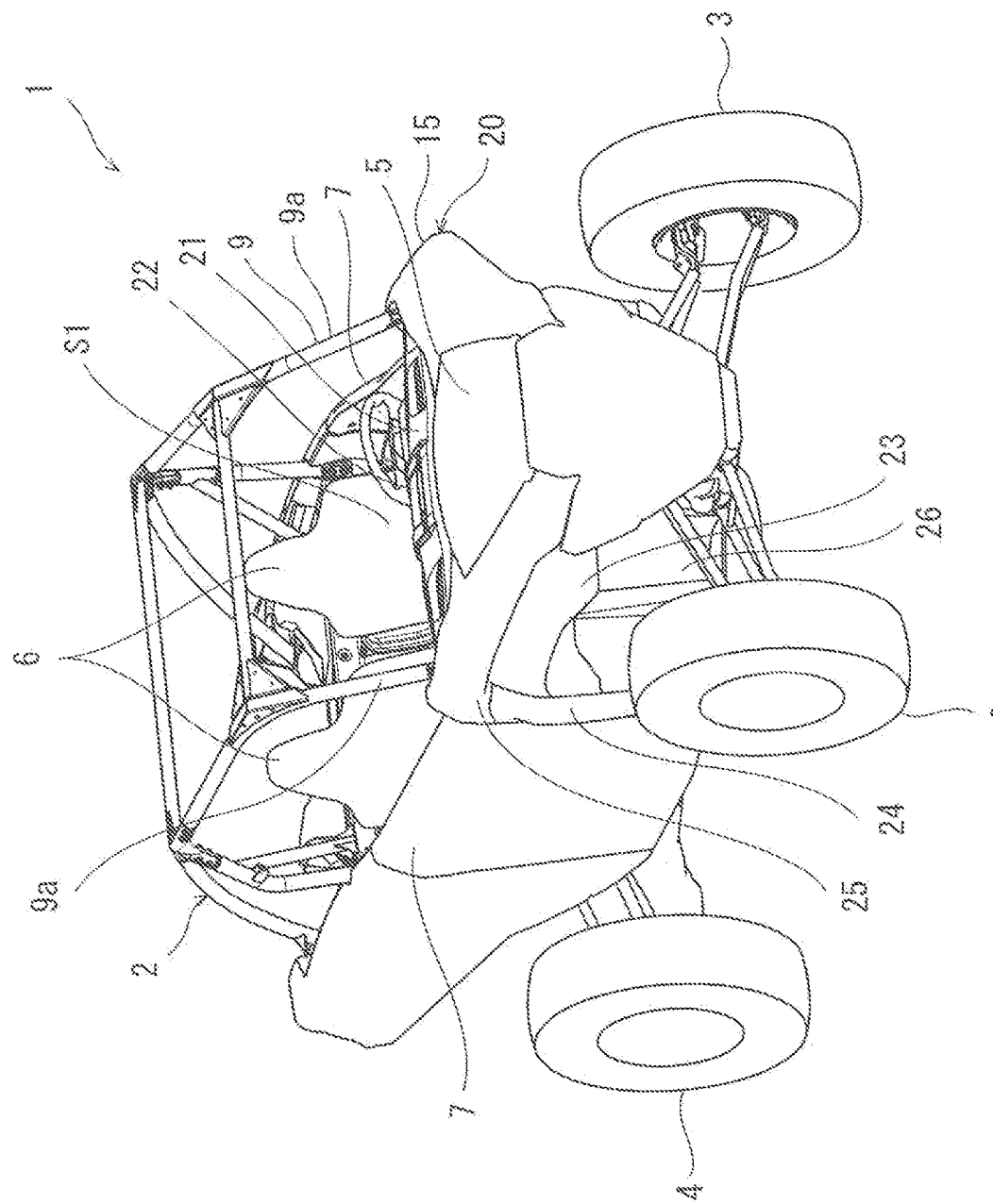
FIG. 1 is a perspective view showing a utility vehicle according to an embodiment.
Figure 2:
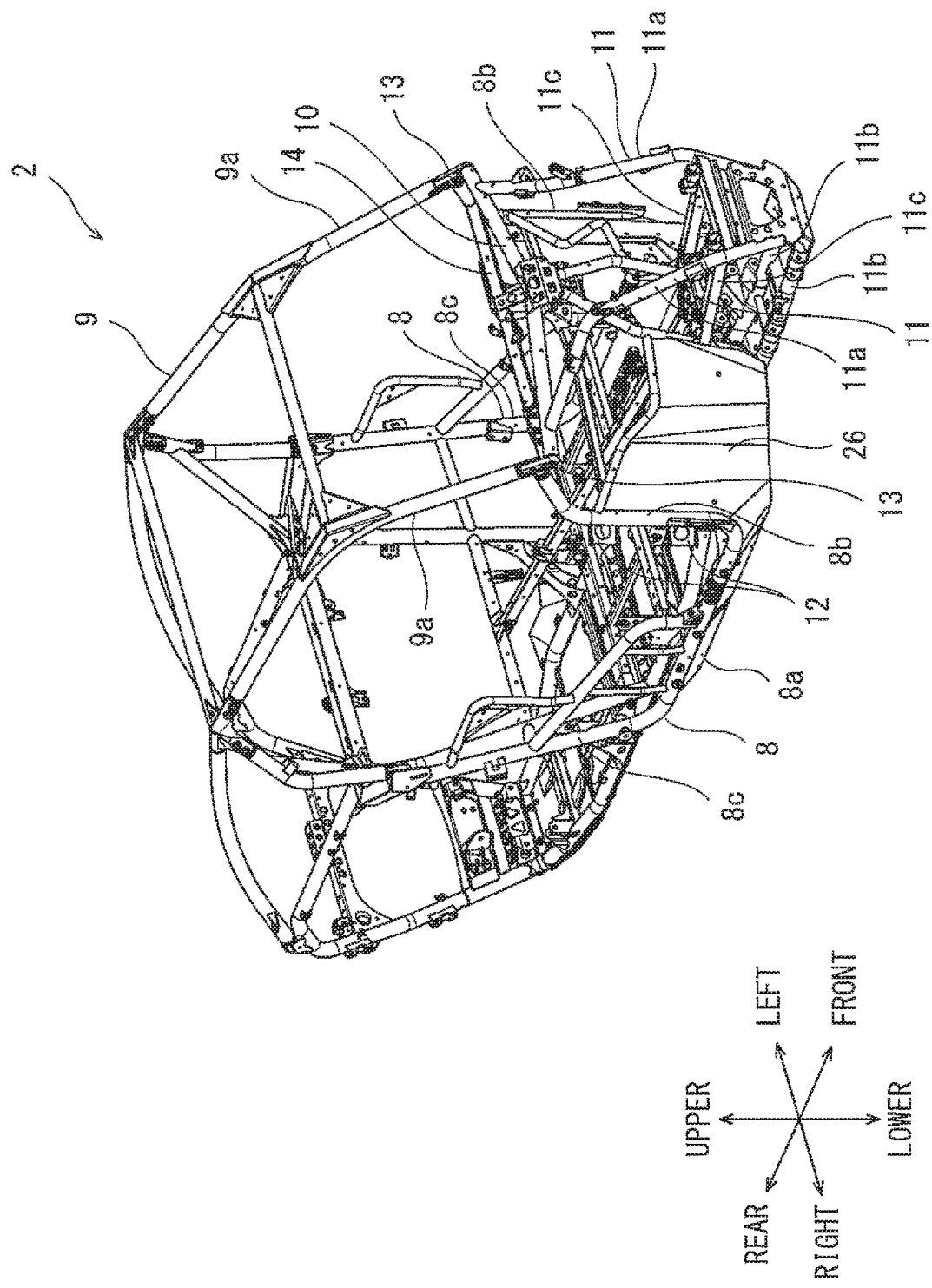
FIG. 2 is a perspective view showing a frame structure of the utility vehicle of FIG. 1.

FIG. 1 is a perspective view showing the utility vehicle 1 according to the embodiment. FIG. 2 is a perspective view showing a frame structure of the utility vehicle 1 of FIG. 1. As shown in FIGS. 1 and 2, the utility vehicle 1 includes a pair of right and left front wheels 3 supported by the front portion of a vehicle body frame 2, and a pair of right and left rear wheels 4 supported by the rear portion of the vehicle body frame 2. A space formed between the right and left front wheels 3 is covered by a resin-made hoof 5 from above. A pair of seats 6 (a driver seat and a passenger seat) are disposed at locations that are rearward of the hood 5 and are in the vicinity of a center of the vehicle body frame 2 in a forward and rearward direction. The pair of seats 6 are disposed in a side-by-side arrangement. Resin-made doors 7 are provided on right and left sides, respectively, of the seats 6 to allow a driver and a passenger to get into and off the utility vehicle 1 through the doors 7.

The vehicle body frame 2 includes a plurality of frame sections which are a pair of right and left side frame sections 8, a cabin frame section 9, a cross frame section 10, a pair of right and left front frame sections 11, and the like. The vehicle body frame 2 is a pipe frame comprised of a plurality of pipe members which are connected to each other.

The pair of right and left side frame sections 8 extend in the forward and rearward direction, on right and left sides of a riding space S1 in which the seats 6 (the driver seat 6 and the passenger seat 6) are provided. More specifically, each of the pair of right and left side frame sections 8 includes a center extension part 8a extending in the forward and rearward direction, at a location that is under the door 7, a front extension part 8b extending upward from the front end portion of the center extension part 8a at a location that is forward of the door 7, and a rear extension part 8c extending upward from the rear end portion of the center extension part 8a at a location that is rearward of the door 7. The front extension part 8b is provided with a plurality of (two in the example of FIG. 2) door hinges 12 supporting the door 7 so that the door 7 is rotatable. At least dash cover support part 14 extending in a rightward and leftward direction (vehicle width direction) connects portions of the pair of front extension parts 8b which are in the vicinity of the upper end portions of the front extension parts 8b.

The cabin frame section 9 is disposed to surround the riding space S1 at a location that is above the pair of right and left side frame sections 8. The cabin frame section 9 includes a pair of right and left front pillar parts 9a. The pair of right and left front pillar parts 9a extend downward while being slightly inclined to the front, from locations that are above the seats 6 and the doors 7.

The cross frame section 10 extends in the rightward and leftward direction at a location that is forward of the seats 6. Cabin frame support parts 13 are provided at right and left end portions, respectively, of the cross frame section 10, and protrude upward from the cross frame section 10. The lower end portions of the front pillar parts 9a are fastened to the cabin frame support parts 13, respectively, by use of, for example, bolts. Specifically, the cross frame section 10 is connected to the cabin frame section 9 via the cabin frame support parts 13. The upper end portions of the front extension parts 8b are fastened to the cabin frame support parts 13, respectively, by use of, for example, bolts. In other words, the cross frame section 10 is also connected to the pair of right and left side frame sections 8 via the cabin frame support parts 13.

The pair of right and left front frame sections 11 are disposed to be spaced apart from each other in the rightward and leftward direction. Each of the pair of right and left front frame sections 11 includes an upper extension part 11a extending forward from the cross frame section 10 while being inclined in a downward direction, a lower extension part 11b extending rearward from the lower end portion of the upper extension part 11a, a center extension part 11c extending rearward from the upper extension part 11a at a location that is above the lower extension part 11b, and the like. The upper extension parts 11a of the pair of right and left front frame sections 11 support the hood 5 at locations that are forward of the cross frame section 10.

As shown in FIG. 1, a part of the plurality of frame sections included in the vehicle body frame 2 is covered by a plurality of frame covers 20. Each of the plurality of frame covers 20 is constituted by one or a plurality of resin-made panels. Alternatively, each of the plurality of frame covers 20 may include a panel other than the resin-made panel, such as a metal-made panel. The plurality of frame covers 20 include a frame upper cover section 21, a dash cover section 22, a pair of right and left tire upper cover sections 23, a pair of right and left lower side cover sections 24, a pair of right and left upper side cover sections 25, and the like.

Figure 3:
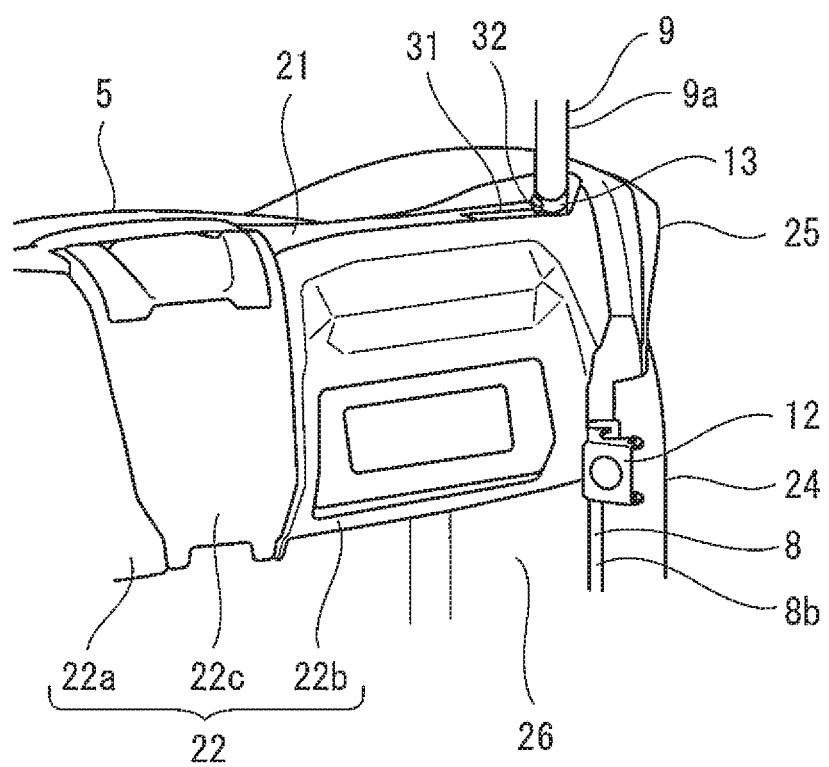
FIG. 3 is a view showing a dash cover section and a region which is in the vicinity of the dash cover section, when viewed from seats (a driver seat and a passenger seat) of the utility vehicle of FIG. 1.
Figure 4:
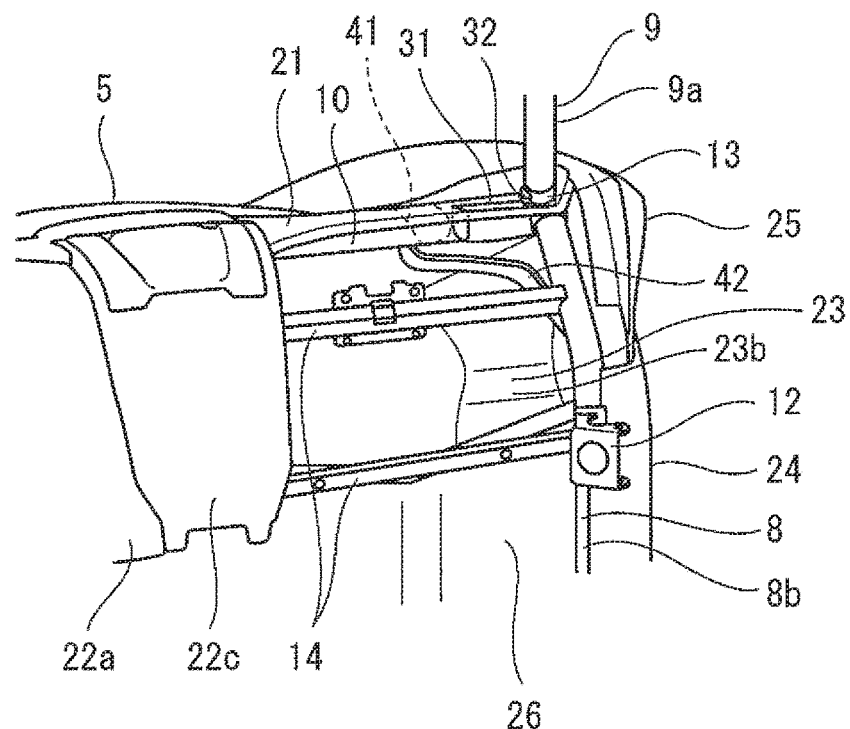
FIG. 4 is a view showing a state in which a part of the dash cover section of FIG. 3 is detached.

FIG. 3 is a view showing the dash cover section 22 and a region which is in the vicinity of the dash cover section 22, when viewed from the seats 6 of the utility vehicle 1 of FIG. 1. FIG. 4 is a view showing a state in which a part (specifically, right dash panel 22b which will be described later) of the dash cover section 22 of FIG. 3 is detached. As shown in FIGS. 3 and 4, the frame upper cover section 21 is disposed rearward of the hood 5. As shown in FIG. 4, the frame upper cover section 21 is disposed to cover the cross frame section 10 from above. The frame upper cover section 21 is secured to the cross frame section 10. A dimension in the rightward and leftward direction, of the frame upper cover section 21, is larger than that of the cross frame section 10. The frame upper cover section 21 is provided with depressed (recessed) parts 33 which are depressed in the downward direction, at right and left end portions thereof. The depressed parts 31 are provided with first openings 32, respectively, through which the cabin frame support parts 13 protruding upward from the cross frame section 10 pass.

The dash cover section 22 is disposed to face the seats 6 (see FIG. 1) in the forward and rearward direction, at a location that is forward of the seats 6. The dash cover section 22 is disposed to cover the cross frame section 10 from the rear. In the present embodiment, the dash cover section 22 includes a left dash panel 22a disposed to face the driver seat 6, a right dash panel 22b disposed to face the passenger seat 6, and a center dash panel 22c disposed between the left dash panel 22a and the right dash panel 22b. The upper end portions of the dash panels 22a to 22c are coupled to the rear end portion of the frame upper cover section 21. The dash panels 22a to 22c are supported by dash cover support parts 14.

The pair of right and left tire upper cover sections 23 are disposed at locations that are forward of the dash cover section 22 and above the front wheels 3. The pair of right and left tire upper cover sections 23 are symmetric in the rightward and leftward direction, with respect to a center line of the utility vehicle 1. As shown in FIG. 1, an outer surface (surface facing forward) 23a of each of the tire upper cover sections 23 faces the corresponding front wheel 3. As shown in FIG. 4, an inner surface (surface facing rearward) 23b of each of the tire upper cover sections 23 faces the dash cover section 22. As indicated by a broken line of FIG. 4, each of the tire upper cover sections 23 is provided with a second opening 42 in an upper portion thereof, at a location that is inward of the first opening 32 in the rightward and leftward direction. The second opening 41 is provided to allow the front frame section 11 to pass therethrough.

Floor guards 26 are provided at the lower edges of the pair of right and left tire upper cover sections 23, respectively. The floor guards 26 are made of metal and serve to protect the riding space S1. Each of the floor guards 26 faces the corresponding front wheel 3. FIG. 2 shows a state in which the floor guards 26 are mounted on the vehicle body frame 2.

The pair of right and left lower side cover sections 24 cover the front extension parts 8b, respectively, of the pair of right and left side frame sections 8, from the side. Each of the pair of right and left upper side cover sections 25 covers the corresponding cabin frame support part 13 and the corresponding front frame section 11, from the side, at a location that is above the corresponding one of the pair of right and left lower side cover sections 24.

Figure 5:
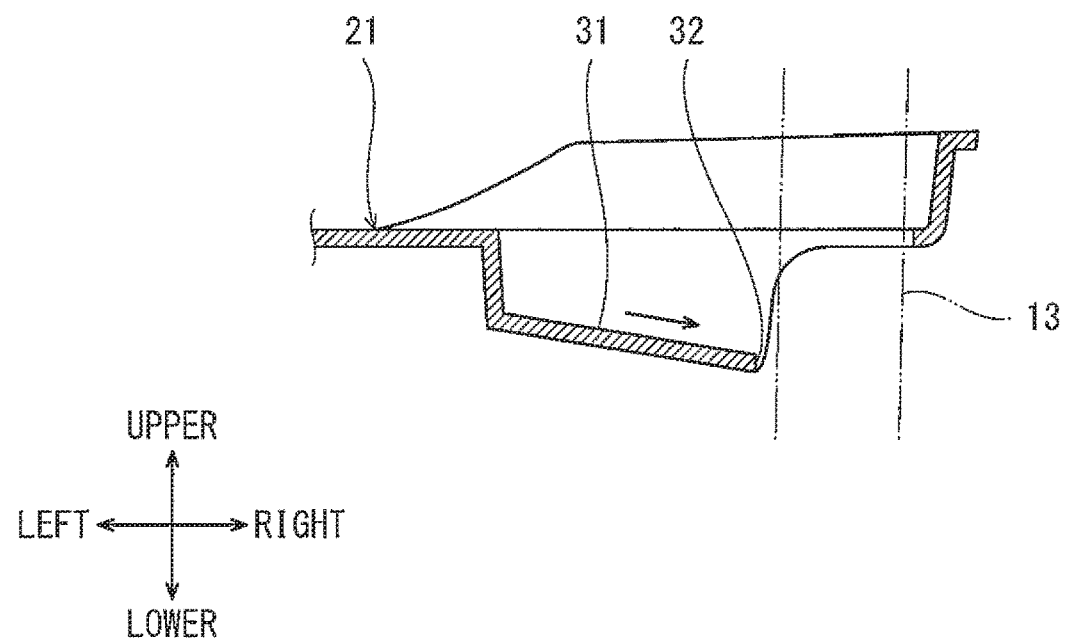
FIG. 5 is a partially enlarged longitudinal sectional view which is taken in a rightward and leftward direction, so as to pass through a first opening and a depressed part of a frame upper cover section of FIG. 3.

FIG. 5 is a partially enlarged longitudinal sectional view which is taken in the rightward and leftward direction, so as to pass through the depressed part 31 and the first opening 32 of the frame upper cover section 21 of FIG. 3. A surface facing upward, of the depressed part 31, is inclined in the downward direction toward the first opening 32. In this structure, the water in the depressed part 31 flows on the inclined surface (corresponding to the inclined portion of the present invention) of the depressed part 31 to the first opening 32, as indicated by an arrow of FIG. 5.

Figure 6:
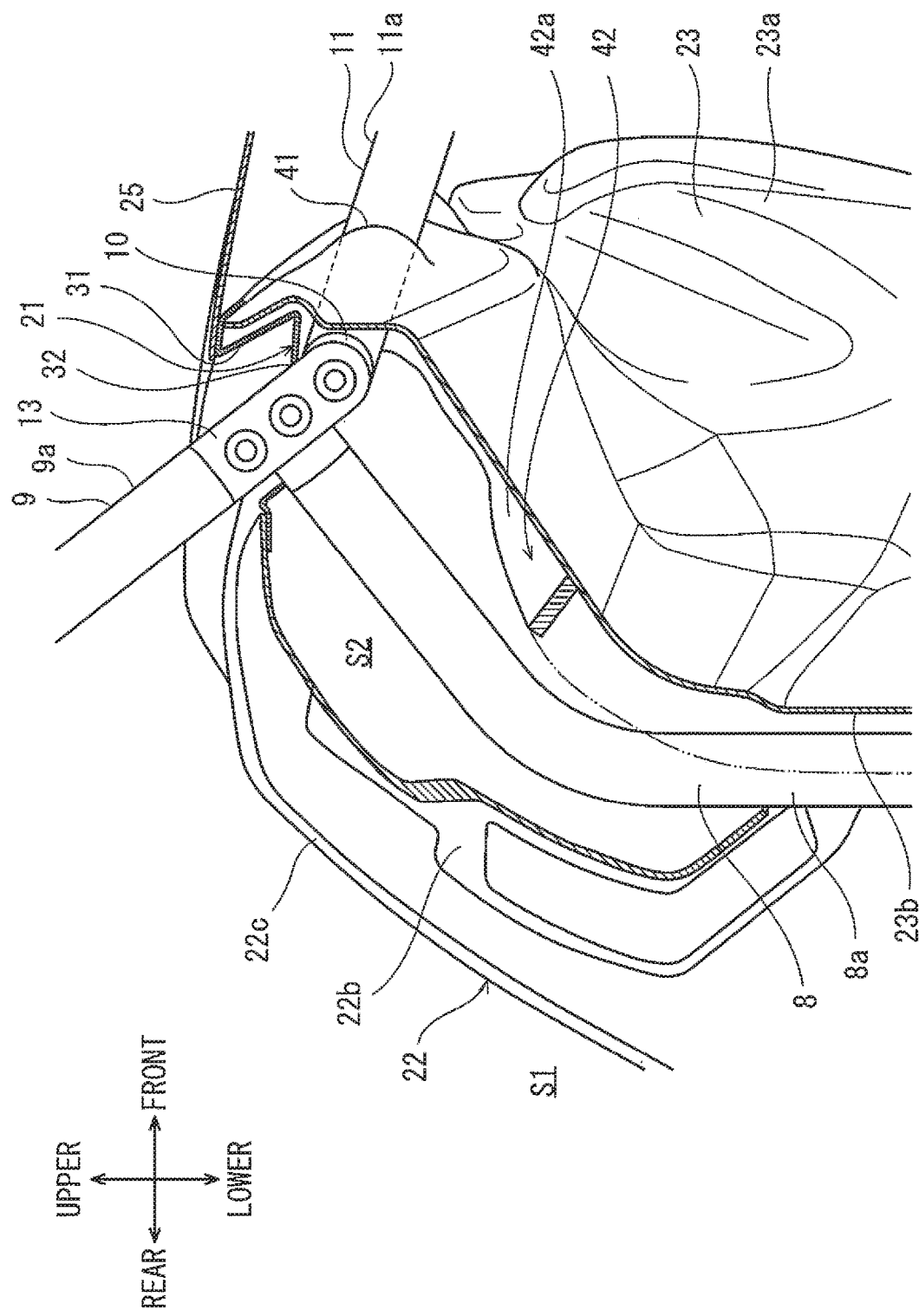
FIG. 6 is a partially enlarged side cross-sectional view which is taken so as to pass through the dash cover section and a tire upper cover section.
Figure 7:
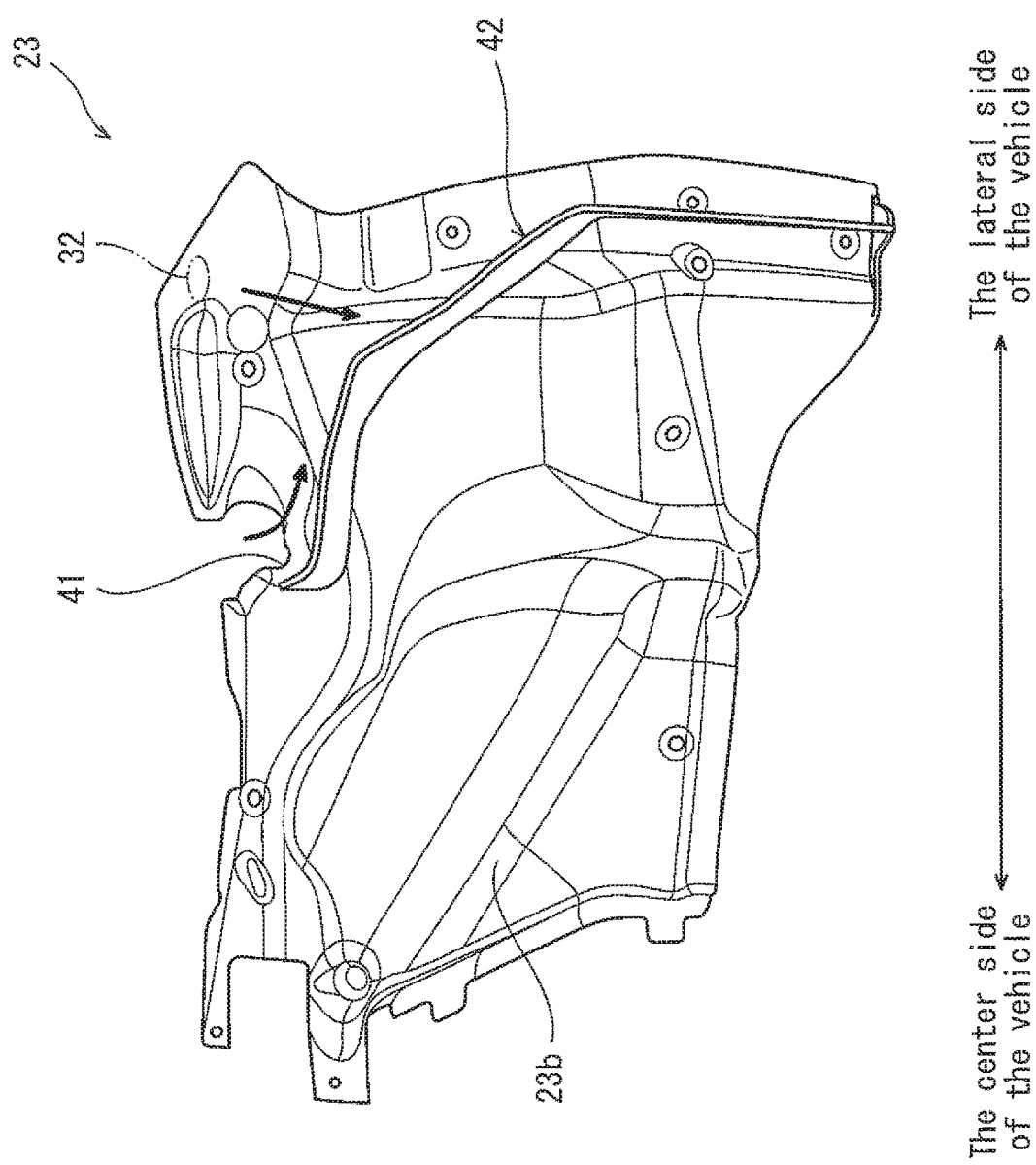
FIG. 7 is a view showing the tire upper cover section, which is viewed from the seats of the utility vehicle.

FIG. 6 is a partially enlarged side cross-sectional view which is taken so as to pass through the dash cover section 22 and the tire upper cover section 23. FIG. 7 is a view showing the tire upper cover section 23, which is viewed from the seats 6 of the utility vehicle 1. As shown in FIGS. 6 and 7, the tire upper cover section 23 is inclined in a rearward direction as it extends downward. Between the dash cover section 22 and the tire upper cover section 23, a frame accommodating space S2 for accommodating the cross frame section 10 therein is formed. The frame accommodating space S2 is in communication with the riding space S1 at a location that is below the dash cover section 22.

There is a possibility that the water flows into the frame accommodating space S2 through a clearance formed between the first opening 32 and the cabin frame support part 13 passing therethrough, and a clearance formed between the second opening 41 and the front frame section 11 passing therethrough. For example, rain water may flow into the frame accommodating space S2 through the first opening 32, or water droplets adhering to the inner side of a windshield mounted on the vehicle body frame 2 may fall onto the upper surface of the frame upper cover section 21 and flow into the frame accommodating space S2 through the first opening 32. For example, muddy water flying from the front wheel 3 may flow into the frame accommodating space S2 through the second opening 41, or water poured (injected) to the front wheel 3 for the purpose of cleaning the front wheel 3 may flow into the frame accommodating space S2 through the second opening 41. A guide 42 is provided in the frame accommodating space S2 to discharge the water which externally flow into the frame accommodating space S2 through the first opening 32 or the second opening 41, to an outside region of the frame accommodating space S2.

The guide 42 is provided at the inner surface 23*b* of the tire upper cover section 23, the inner surface 23*b* facing the dash cover section 22. The guide 42 has a guide surface 42*a* facing upward. The guide 42 protrudes from the inner surface 23*b* of the tire upper cover section 23 so that the guide surface 42*a* crosses the inner surface 23*b* and extends in the rightward and leftward direction along the inner surface 23*b*. As shown in FIG. 6, the guide surface 42*a* is inclined in an upward direction as the guide surface 42*a* is away from the inner surface 23*b*. In this structure, the water received on the guide surface 42*a* gathers in a region which is closer to the inner surface 23*b*.

In FIG. 7, the first opening 32 formed in the frame upper cover section 21 in a case where the tire upper cover section 23 is seen in the forward and rearward direction is indicated by two-dot chain line so that the location of the first opening 32 with respect to the tire upper cover section 23 can be understood. As shown in FIG. 7, the guide 42 is disposed immediately below the first opening 32 and the second opening 41 in a front view (when viewed from the front). The guide surface 42*a* of the guide 42 extends in the rightward and leftward direction. The guide surface 42*a* of the guide 42 is inclined in the downward direction, from the center side of the utility vehicle 1 to the lateral side of the utility vehicle 1. In this structure, as indicated by arrows of FIG. 7, the water entering through the first opening 32 and the water entering through the second opening 41 flow in the downward direction on the inner surface 23*b*, is then received by the guide surface 42*a*, and is then guided along the guide surface 42*a* in the downward direction.

Figure 8:
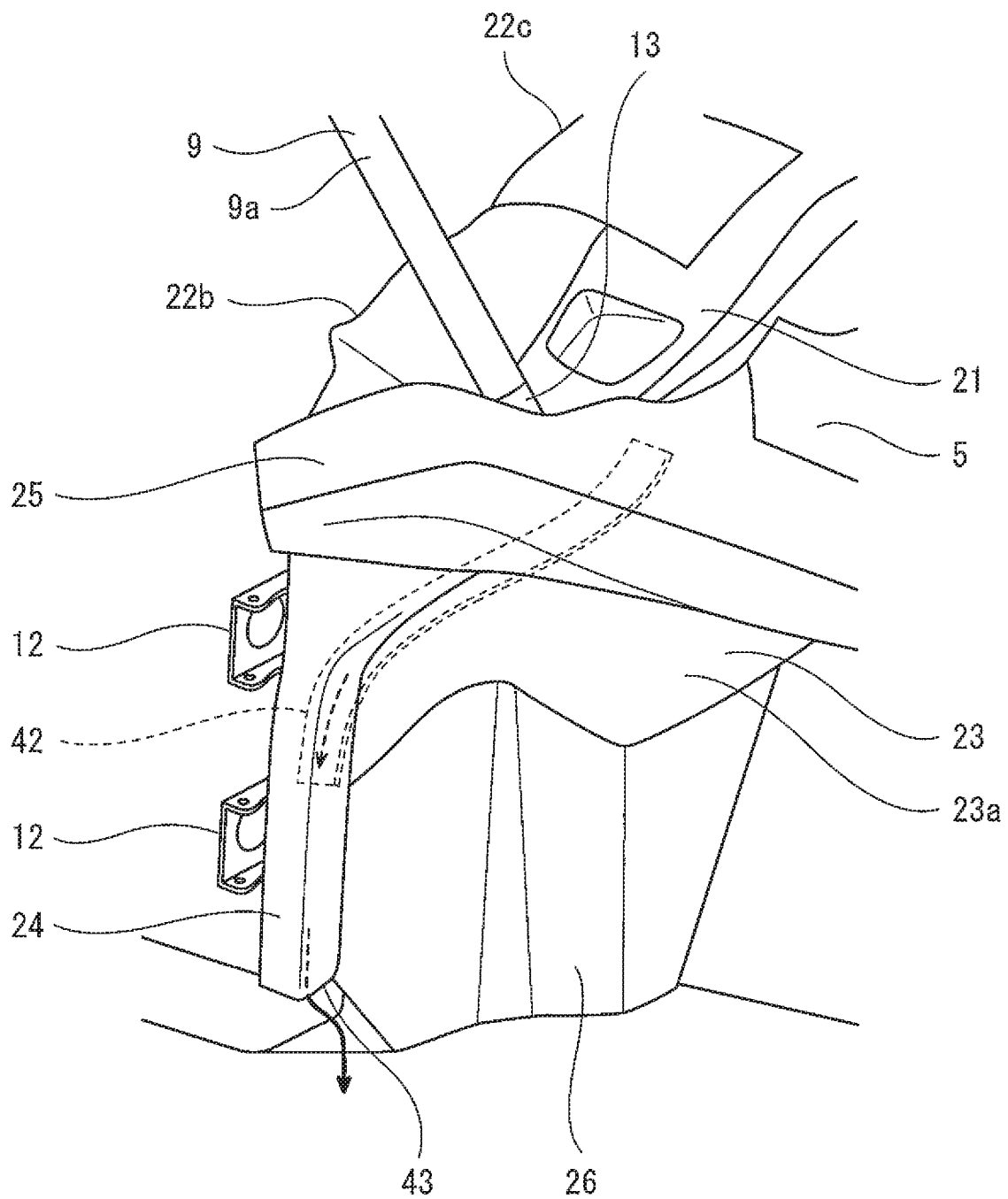
FIG. 8 is a partially enlarged perspective view showing a path of water guided by a guide of FIG. 7.
Figure 9:
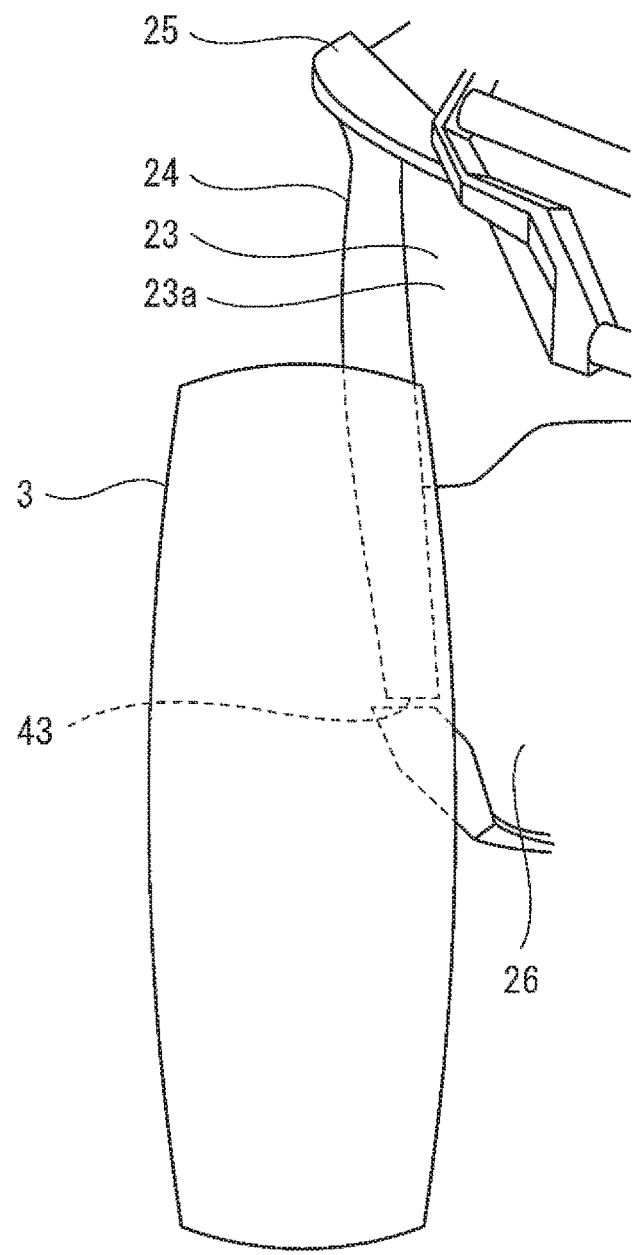
FIG. 9 is a partially enlarged front view showing a front wheel of the utility vehicle of FIG. 1, and a region which is in the vicinity of the front wheel.
Figure 9:
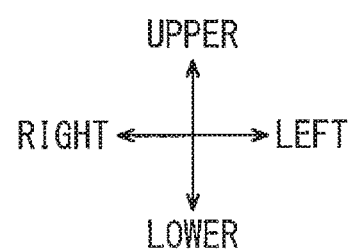

FIG. 8 is a partially enlarged perspective view showing a path of the water guided by the guide 42 of FIG. 7. FIG. 9 is a partially enlarged front view showing the front wheel 3 of the utility vehicle 1 of FIG. 1, and a region which is in the vicinity of the front wheel 3. As shown in FIGS. 8 and 9, a discharge port 43 is provided below the first opening 32 and the second opening 41. Via the discharge port 43, the frame accommodating space S2 and an outside region of the frame accommodating space S2 are in communication with each other. The water which externally flows into the frame accommodating space S2 through the first opening 32 or the second opening 41, is guided by the guide 42, and is discharged to the outside region through the discharge port 43. The discharge port 43 is disposed at a location that is forward of the hinges 12 of the doors 7 provided on the right and left sides of the seats 6, and that is rearward of the front wheel 3. More specifically, the discharge port 43 is formed by the lower end portion of the lower side cover section 24, and opens in the downward direction. The lower end portion of the guide surface 42*a* is located immediately above the discharge port 43. In this structure, the water guided by the guide surface 42*a* flows in the downward direction from the lower end portion of the guide surface 42*a*, and is then discharged to the outside region of the frame accommodating space S2 through the discharge port 43. As shown in FIG. 9, the discharge port 43 is disposed to overlap with the front wheel 3 in a front view (when viewed from the front).

As described above, in the present embodiment, even in a case where the water externally flows into the frame accommodating space S2 through the first opening 32 or the second opening 41, this water is guided by the guide 42 to the discharge port 43 and is discharged to the outside region of the frame accommodating space S2 through the discharge port 43. This makes it possible to prevent a situation in which the water which flows into the frame accommodating space S2 through the opening 32 or 41 enters the riding space S1.

The guide 42 is provided at the inner surface 23*b* of the tire upper cover section 23, the inner surface 23*b* facing the dash cover section 22. Since the guide 42 is provided at the tire upper cover section 23 in this way, the guide 42 can be disposed by work for mounting the tire upper cover section 23 on the vehicle body frame 2, in manufacturing the utility vehicle 1.

The guide surface 42*a* of the guide 42 is inclined in the upward direction as the guide surface 42*a* is away from the inner surface 23*b* of the tire upper cover section 23. In this structure, the water received on the guide surface 42*a* gathers in a region which is closer to the inner surface 23*b*. This makes it possible to prevent a situation in which the water falls from the end portion of the guide surface 42*a*, which is closer to the dash cover section 22.

The guide 42 is disposed immediately below the opening 32 through which the cabin frame support part 13 pass, in a front view. This makes it possible to prevent a situation in which the water which externally flows into the frame accommodating space S2 through the opening 32 formed in the frame upper cover section 21 to allow the frame support part 13 to pass therethrough enters the riding space S1.

Since the inclined portion of the upper surface of the frame upper cover section 21 is inclined in the downward direction toward the opening 32, the water on the inclined portion of the upper surface of the frame upper cover section 21 is guided to the opening 32. This makes it possible to prevent accumulation of the water on the upper surface of the frame upper cover section 21.

In the front view, the guide 42 is disposed immediately below the opening 41 formed in the tire upper cover section 23 to allow the front frame section 11 to pass therethrough. This makes it possible to prevent a situation in which the water which externally flows into the frame accommodating space S2 through the opening 41 formed in the tire upper cover section 23 enters the riding space S1.

By use of one guide 42, it becomes possible to prevent a situation in which the water which externally flows into the frame accommodating space S2 through the first opening 32 formed in the frame upper cover section 21 and through the second opening 41 formed in the tire upper cover section 23 enters the riding space S1.

Since the discharge port 43 is disposed to overlap with the front wheel 3 in the front view, the water can be discharged through the discharge port 43 to a region to which the rain water flying from the front wheel 3 is poured.

Since the discharge port 43 is disposed at a location that is forward of the hinges 12 of the door 7 provided on the right or left side of the seats 6, and that is rearward of the front wheel 3, the discharge port 43 can be easily formed in the frame cover 20.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

For example, it is not necessary to provide both of the first opening 32 and the second opening 41 in the frame cover 20. Alternatively, only one of the first opening 32 and the second opening 41 may be provided in the frame cover 20. Further, the frame cover 20 may be provided with an opening different from the first opening 32 and the second opening 41, to allow the vehicle body frame 2 to pass therethrough.

The guide 42 does not necessarily protrude from the inner surface 23b of the tire upper cover section 23. The inner surface 23b of the tire upper cover section 23 may have a shape for allowing the water which flows into the frame accommodating space S2 through the opening 41 to be guided to the discharge port 43. In this case, a portion of the inner surface 23b of the tire upper cover section 23, the portion being configured to guide the water in the accommodating space S2 to the discharge port 43, corresponds to the guide of the present invention. The guide 42 may be provided in a constituent other than the tire upper cover section 23, among the constituents of the utility vehicle 1. For example, the guide 42 may be provided in a frame cover section other than the tire upper cover section 23, or the vehicle body frame 2. Moreover, the location of the discharge port 43 can be suitably changed.

What is claimed is:

1. A utility vehicle comprising:
a vehicle body frame including:
a pair of right and left side frame sections extending in a forward and rearward direction, on right and left sides of a riding space where a driver seat and a passenger seat are provided,
a cabin frame section surrounding the riding space at a location that is above the pair of right and left side frame sections, and
a cross frame section extending in a rightward and leftward direction at a location that is forward of the driver seat and the passenger seat and connecting the pair of right and left side frame sections to each other; and
a frame cover including a dash cover section disposed forward of the driver seat and the passenger seat, and a tire upper cover section disposed at a location that is forward of the dash cover section and above a front wheel, the frame cover defining a frame accommodating space for accommodating the cross frame section, between the dash cover section and the tire upper cover section,
wherein the frame cover is provided with at least one opening through which the frame accommodating space and an outside region are in communication with each other, the vehicle body frame being configured to pass through the at least one opening,
wherein a discharge port is disposed below the at least one opening to discharge to the outside region, water which externally flows into the frame accommodating space through the at least one opening, and
wherein a guide is provided in the frame accommodating space, and includes a guide surface inclined in a downward direction toward the discharge port, the guide being configured to guide to the discharge port, the water which flows into the frame accommodating space through the at least one opening.

2. The utility vehicle according to claim 1,
wherein the guide is provided at an inner surface of the tire upper cover section, the inner surface facing the dash cover section.

3. The utility vehicle according to claim 2,
wherein the guide protrudes from the inner surface of the tire upper cover section so that the guide surface crosses the inner surface of the tire upper cover section and extends in a rightward and leftward direction along the inner surface of the tire upper cover section, and
wherein the guide surface is inclined in an upward direction as the guide surface is away from the inner surface of the tire upper cover section.

4. The utility vehicle according to claim 1,
wherein the frame cover includes a frame upper cover section covering the frame accommodating space from above,
wherein the opening is provided in the frame upper cover section to allow a cabin frame support part to pass therethrough, the cabin frame support part being coupled to the cabin frame section and protruding upward from corresponding one of the pair of right and left side frame sections and/or the cross frame section, and
wherein in a front view, the guide is disposed immediately below the opening.

5. The utility vehicle according to claim 4,
wherein an upper surface of the frame upper cover section has an inclined portion inclined in a downward direction toward the opening.

6. The utility vehicle according to claim 1,
wherein the vehicle body frame includes a front frame section extending forward from the cross frame section,
wherein the opening is provided in the tire upper cover section to allow the front frame section to pass therethrough, and
wherein in a front view, the guide is disposed immediately below the opening.

7. The utility vehicle according to claim 1,
wherein the vehicle body frame includes a front frame section extending forward from the cross frame section, and the frame cover includes a frame upper cover section covering the frame accommodating space from above, wherein the at least one opening includes:

a first opening provided in the frame upper cover section to allow a cabin frame support part to pass therethrough, the cabin frame support part being coupled to the cabin frame section and protruding upward from corresponding one of the pair of right and left side frame sections and/or the cross frame section, and a second opening provided in the tire upper cover section to allow the front frame section to pass therethrough, the second opening being closer to a center of the utility vehicle in the rightward and leftward direction than the first opening, and wherein the guide extends in the rightward and leftward direction and is disposed immediately below the first opening and the second opening, in a front view.

8. The utility vehicle according to claim 1, wherein the discharge port is disposed to overlap with the front wheel in a front view.

9. The utility vehicle according to claim 1, wherein the discharge port is disposed at a location that is forward of a hinge of a door provided on a right or left side of the driver seat and the passenger seat, and that is rearward of the front wheel.

\* \* \* \* \*